(12) United States Patent
Macrae

(10) Patent No.: US 8,918,129 B2
(45) Date of Patent: Dec. 23, 2014

(54) INCREASING CAPACITY IN COMMUNICATIONS SYSTEMS USING POLARIZED DATA SIGNALS

(76) Inventor: Nigel Macrae, Las Vegas, NV (US)

( * ) Notice: Subject to any disclaimer, the term of this patent is extended or adjusted under 35 U.S.C. 154(b) by 560 days.

(21) Appl. No.: 13/237,846

(22) Filed: Sep. 20, 2011

(65) Prior Publication Data

US 2013/0072240 A1 Mar. 21, 2013

(51) Int. Cl.
*H04B 7/00* (2006.01)
*H04B 10/118* (2013.01)

(52) U.S. Cl.
CPC .................................... *H04B 10/118* (2013.01)
USPC .......................................... 455/500; 370/480

(58) Field of Classification Search
CPC ............... G01S 13/90; G01S 13/9035; G01S 2013/9076; G01S 7/026; G02F 2001/133541; H04B 1/02; H04B 7/10; H04B 10/118
USPC .................... 455/500, 110; 370/480; 375/267
See application file for complete search history.

(56) References Cited

U.S. PATENT DOCUMENTS 7,957,425 B2 * 6/2011 Macrae ......................... 370/480

* cited by examiner

*Primary Examiner* — Golam Sorowar

(57) ABSTRACT

A method and system is provided for communicating four distinct data signals over a single frequency. Data signals carrying first and second data are polarized in two distinct circular polarities and are transmitted. Signals consisting of third data signal and a 180 degree out of phase equal amplitude inverse of third data signal are transmitted together in two orthogonal linear polarities. Signals consisting of fourth data signal and of 180 degree out of phase equal amplitude inverse of said fourth data signal are transmitted together in two orthogonal linear polarities and at a 45 degree rotation from said third data signals. The circular signals are received without interfering linear signals since the inverse linear signals cancel in the circularly polarized antenna at reception. A method for canceling the interfering circular signals from the linear signals is disclosed. The amount of distinct data transmitted over the single frequency is doubled.

14 Claims, 5 Drawing Sheets

FIG 1R
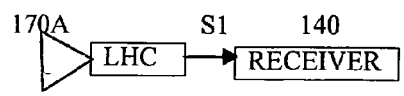
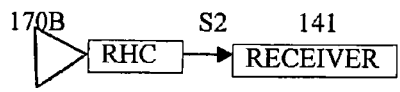
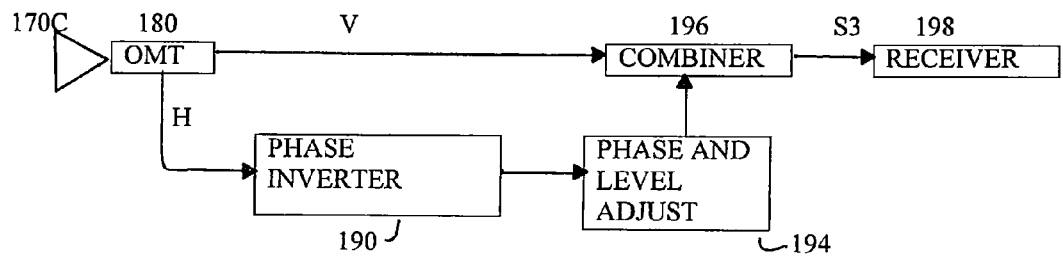
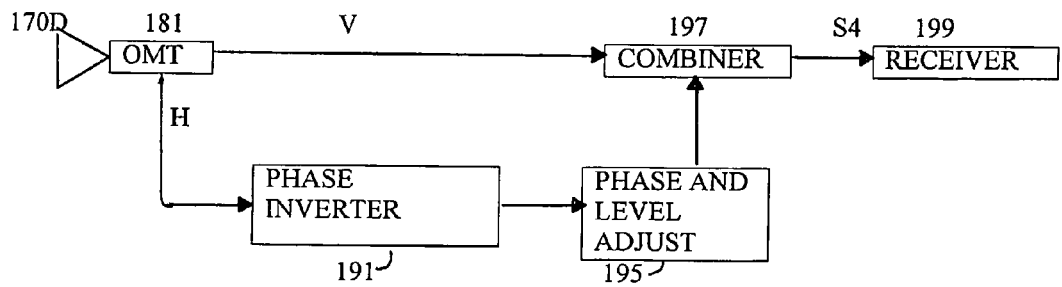

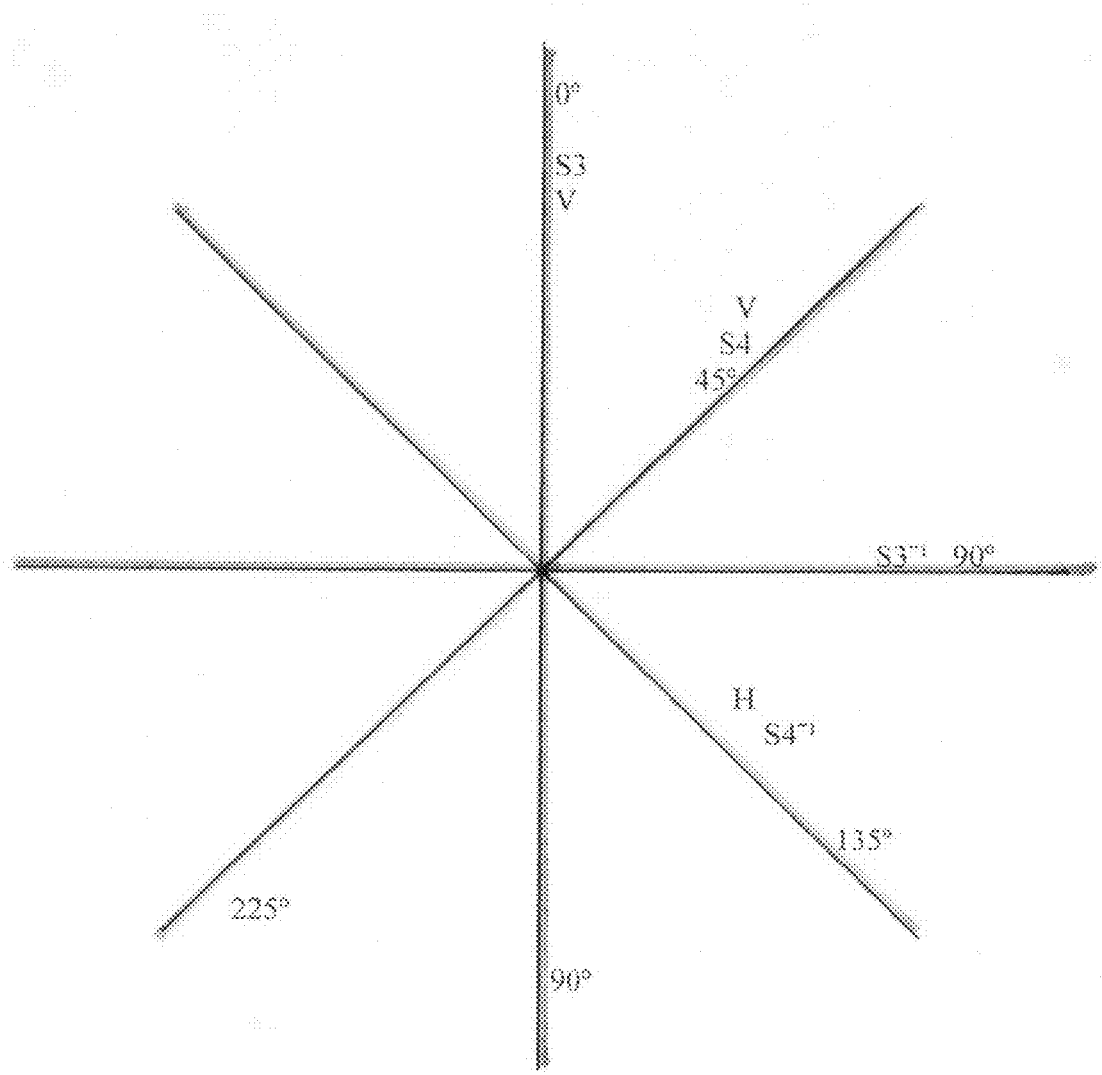

FIG 3

RECEIVING STATION

**LINEAR RECEIVE
ANTENNA 302A**

DESCRIPTION OF PORT
VERTICAL PORT:
RECEIVES S3 LINEAR

RECEIVED SIGNALS
INCLUDES S3 + 50% LHC + 50% RHC

HORIZONTAL PORT:
ORTHOGONAL TO VERTICAL PORT
RECEIVES $S3^{-1}$ LINEAR

INCLUDES $S3^{-1}$ + 50% LHC + 50% RHC

**310
RECEIVE ELECTRONICS**
INVERT SIGNAL FROM VERTICAL PORT AND COMBINES WITH
HORIZONTAL PORT
S3 + 50% LHC + 50% RHC − ($S3^{-1}$ + 50% LHC + 50% RHC) = 2 X S3

INCREASING CAPACITY IN COMMUNICATIONS SYSTEMS USING POLARIZED DATA SIGNALS

BACKGROUND

The method and system disclosed herein, in general, relates to information communication. More particularly, the method and system disclosed herein relates to communicating distinct data over a single frequency using multiple signals under two different polarization schemes.

Current satellites and ground based radios, typically reuse frequencies by transmitting signals in two polarities of one of two polarization schemes: left and right hand circular polarization, or vertical and horizontal linear polarization. Normally, if different data signals are transmitted on the same frequency in both linear and circular polarizations, the data signals would interfere with each other. Consequently, no more than two different data signals are transmitted on the same frequency at an instant on the same or proximate path, representing the two polarities of a selected polarization scheme.

Another form of frequency reuse is through separation. Additional channels can be transmitted on the same frequencies as long as there is sufficient distance between the transmitters so that antennas can pick up the selected transmissions with minimal interference. In the case of satellites, the satellites must maintain a distance of about two degrees of arc before the same frequencies can be reused. In the case of broadcast television, terrestrial microwave radios, and for commercial radio stations geographic distance is used to ensure sufficient distance or attenuation between the transmitters.

Another form of reuse is similar to separation described above. Instead of physical separation the separation is caused by use of directional antennas. For example, one cell tower can hold several directional antennas each pointing in a different direction. Each antenna carries different data signals on the same frequencies. Because of the directionality of each antenna, only signals on the front side of the antenna can be received or picked up. This technique is often used in cell phone communications.

Two forms of polarization are referenced in this application, linear and circular polarizations. In linear polarization, the electric component or the magnetic component of an electromagnetic wave is confined to within a single plane along the direction of propagation of the electromagnetic wave. Linearly polarized signals are either horizontally polarized or vertically polarized, each being orthogonal to the other. In circular polarization, the tip of the electric field vector is made to describe a circle as time passes. Circularly polarized data signals are either right hand circularly polarized or left hand circularly polarized. Both linear and circular polarization schemes are the two extremes of elliptical polarization.

Polarization can be established by various methods, for example, through the shape of the radiation elements in the antenna in the case of a lower frequency antenna, for example a frequency modulated (FM) radio antenna, or by a feed horn often feeding a larger usually parabolic reflector in a higher frequency band. A circular polarized antenna might involve two linear dipoles orthogonal to each other with a 90 degree phase relationship between the radiated signals. The different polarization schemes and this disclosure apply to any frequency electromagnetic waves that can be polarized including, for example, light, microwave, and radio frequency waves.

A basic principle of electromagnetic waves is the principle of linear superposition: "when two or more waves are present simultaneously at the same place the resultant wave is the sum of the individual waves."
Physics $3^{rd}$ Edition by Cutnell/Johnson, Wiley and Sons, 1995. ISBN 0-471-59773-2, page 521.

As used herein, the term "feed horn" or "feed" refers to an apparatus that includes both a horn and a transducer, also called a polarizer. The transducer (OMT) radiates and polarizes the signal for transmission. The horn shapes the signal. A typical transducer is a mechanical device that bolts to the horn. The horn illuminates the antenna, as well as picks up already polarized data signals for reception. A transducer also routes the data signals from a transmission side of input flanges to the horn or from the horn to a reception side of output flanges. A transducer can form or receive orthogonal signals of linear, circular or both polarities. This is an example of one antenna design; however, this example is not meant to limit this disclosure to a particular antenna design.

As used herein, "data signal" refers to an electromagnetic signal modulated to carry information of any kind.

Electromagnetic waves do not interact when transmitted through a non absorbing media such as space. Left hand circularly polarized data signals and right hand circularly polarized data signals do not interfere with each other once transmitted. Similarly, horizontal and vertical linearly polarized data signals do not modify each other once transmitted and pass through space without interference. One of the characteristics of a linear receive antenna is that when aimed toward the circularly polarized signal source each pole of a linear feed and transducer, whether horizontal or vertical, picks up both left hand circularly polarized signals and right hand circularly polarized signals simultaneously in almost equal levels of about 3 decibels (dB) less than, therefore half of, the full strength of a correctly aligned circularly polarized feed. Similarly, when directed toward the source, an antenna or feed of circular polarity picks up any transmitted horizontal and vertical linearly polarized signals in both left and right circular polarities at about half the level of what a correctly aligned linear feed would. Along the axis of transmission, the rotation or angle of the linear receive feed in relation to the circular polarized transmission feed does not affect the reception level of circularly polarized signals in the linear feed. Similarly, each pole of a circular feed and transducer, left hand circular or right hand circular, picks up each horizontally polarized signal in almost equal levels and each vertically polarized signal in almost equal levels.

On any given frequency, normally attempting to transmit both linearly polarized signals and circularly polarized signals simultaneously results in so much interference in a receive antenna that the received signal is not usable. Linearly polarized signals suffer from interference from circularly polarized signals, whereas circularly polarized signals suffer from interference from linearly polarized signals.

A patent, U.S. Pat. No. 7,957,425, issued to this same applicant discloses a method to increase capacity in a radio frequency system by adding two inverted signals in a different polarization scheme from a first polarization scheme. This present disclosure shows a way to add a fourth unique data stream on the same path under certain conditions. In this disclosure two circularly polarized signals, left and right hand circular polarized, each carrying a unique data stream and are transmitted. Two inverse, 180 degrees out of phase to each other and equal amplitude, data signals carrying a third data signal are transmitted in linear polarities orthogonal to each other, for example horizontal and vertical linear signals. A fourth data signal is encoded onto a fourth carrier, two copies are made, then one is inverted (180 degrees out of phase) from the other. The fourth data signals are then transmitted orthogonally to each other and at 45 degree rotation around the transmit axis from the two linear signals carrying third data. This technique allows for transmission of up to four data signal along a same or proximate path on the same frequency at the same time. The previous patent, U.S. Pat. No. 7,597,425, and the discussion below discusses reception and decoding of the inverse linear data signals with the interfering circular data signals.

Another embodiment uses three pairs of inverse data signals. Two data signals and their inverses are transmitted in linear polarity and a third data signal and its inverse are transmitted in circular polarities.

SUMMARY OF THE INVENTION

This summary is provided to introduce a selection of concepts in a simplified form that are further described in the detailed description of the invention.

The method and system disclosed herein addresses the need for communicating up to four distinct data signals over a same frequency. The method and system disclosed herein transmits additional data signals by using polarized electromagnetic emissions along a same or proximate path resulting in an increase in capacity.

Multiple data signals conveying first data, second data, third data and fourth data are provided. Each data signal is a stream of data encoded by any of many known means onto a transmit carrier of the selected transmit frequency. All four data signals are of the same frequency. The first data signal conveys the first data, the second data signal conveys the second data, and the third data signal and the inverse of the third data signal convey the third data, the fourth data signal and the inverse of the fourth data signal convey the fourth data.

The first data signal S1 and the second data signal S2 are polarized in opposite circular polarities and transmitted. The circularly polarized first data signal is, for example, a right hand circularly polarized data signal and the circularly polarized second data signal is, for example, a left hand circularly polarized data signal.

The third data signal S3 is divided into identical copies. One of these copies is inverted (phase changed 180 degrees). The two inverse third data signals are transmitted in two orthogonal ports of a linear polarity antenna while maintaining their 180 degree out of phase phase relationship. The linearly polarized third data signal is, for example, a horizontally polarized data signal and the inverse of the linearly polarized third data signal is, for example, a vertically polarized data signal The phase and amplitude before transmission of the third data signal and the inverse of the third data signal are adjusted, if necessary, for enabling the third data signal and the inverse of the third data signal to cancel each other out when received together at a same antenna or feed horn of the circular polarity. Complete cancellation of two electromagnetic signals occurs when two same signals are 180 degrees out of phase and of equal amplitude are combined.

The fourth data signal is divided into identical copies. One of these copies is inverted, i.e., phase changed 180 degrees. The phase of the fourth data signal and the inverse of the fourth data signal are adjusted, if necessary, to maintain the 180 degree out of phase relationship to each other when they are transmitted, and are transmitted at equal amplitudes to enabling the fourth data signal and the inverse of the fourth data signal to cancel each other out when received together at an antenna or feed of the circular polarity. One of these two inverse fourth data signals is transmitted at 45 degrees off axis from the vertically polarized third data signal S3 and the remaining fourth data signal is transmitted at 135 degrees off axis from the vertically polarized third data signal. The two 180 degrees out of phase fourth data signals signals are transmitted in two orthogonal linear ports of an antenna.

In this exemplary, the vertical signal carrying the third data signal is assumed to transmit at 0 degrees the horizontal signal carrying the inverted third data is transmitted at 90 degrees. Consequently, when looking at the power levels of the third data signal as transmitted there are nulls that occur at ±45 degrees and ±135 degrees around the transmit axis. The fourth signal and its inverse are transmitted in these nulls.

When the data signals S1 and S2 are received by an antenna of circular polarity, the circularly polarized first data signal and the circularly polarized second data signal are received and decoded by the right hand circular polarity and the left hand circular polarity respectively. Since the each polarity of the circular antenna picks up both the vertical and horizontal linear polarities at equal levels and since electromagnetic signals of equal amplitude and exactly 180 degrees out of phase with each other cancel, the linearly polarized third data signal and the inverse of the third data signal cancel each other out at reception at the antenna of circular polarity and before reaching any electronics. The two linear signals containing the fourth data are designed to cancel upon reception in a circular feed or antenna. The linearly polarized fourth data signal and the inverse of the fourth data signal cancel each other out at reception at the antenna of circular polarity and before reaching any electronics. The circularly polarized data signals are then processed and decoded as they would normally be, as if there were no linearly polarized data signals present. Both the left hand circularly polarized data signal and the right hand circularly polarized data signal are received at either a same antenna of circular polarity or separate antennas of left hand circular polarity and right hand circular polarity respectively.

In order to detect the linear third data signal, the third data signal and the inverse of the third data signal both are received by two orthogonal ports of an antenna of linear polarity. The antenna must be aligned to pick up the selected two inverse signals in the two receive linear ports, vertical and horizontal. One of the sets of data signals received in either the horizontal polarity or the vertical polarity is inverted, and one of the two sets of data signals is phase adjusted if necessary so that the linear signals match in phase, then the first set is summed with the signal set from the other polarity. When the data signals are inverted and summed together, the linearly polarized data signals match each other, thereby increasing the signal strength of the linearly polarized data signals. Since the two interfering circularly polarized data signals are received at equal levels in both linear ports, and one of the two received signals is inverted, the interfering circularly polarized data signals negate each other, thereby canceling each other out at summation, resulting in minimal interference by the circular polarized signals to the linearly polarized data signal S3. In the antenna of linear polarity in the horizontal polarity the third data signal and both circularly polarized data signals are received. In the vertical polarity, the inverse of the third data signal and both the circularly polarized data signals are received. One of the received sets of data signals, for example, the data signal comprising the inverse of the third data signal and the circularly polarized data signals received in the vertical polarity of the same antenna is inverted and summed with the other received data signals, for example, the data signal comprising the third data signal and the two circularly polarized data signals received in the horizontal polarity of the same antenna. Upon summation, the left hand circularly polarized data signals and the inverse of the left hand circularly polarized data signals cancel each other out, and the right hand circularly polarized data signals and the inverse of the right hand circularly polarized data signals cancel each other out. The third data signal and the inverse of the inverse of the third data signal match each other in phase and amplitude resulting in increased signal strength of the third data signal, enabling the antenna of linear polarity to decode the third data without interference.

The fourth data signal is received in exactly the same method as the third. The two linear ports of the antenna are aligned to receive the two 180 degree out of phase fourth data signals. One of the two received signals is inverted and summed with the other to match the fourth data signal phase relationship. The two interfering circular data signals cancel and the two linear signals sum.

The circularly polarized first data signal and the circularly polarized second data signal are transmitted from either the same transmitting station or from different transmitting stations to one or more receiving stations. The two inverted third data signals need to be transmitted form the same station as each other so as to maintain the inverse phase relationship. The fourth data signals can be transmitted form the same or different location as the first second and third, but the fourth data signal and its inverse need to be transmitted from the same station in order to maintain their inverted phase relationship as they propagate through the medium.

Using the above technique, capacity can be increased in any transmission medium that allows for transmission of polarized electromagnetic signals.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIG. 1R exemplary illustrates a system for receiving the four channels of distinct data transmitted over a same frequency using multiple polarized data signals.

FIG. 2 Illustrates the transmission of the four linear signals consisting of two distinct data signals and their inverses.

FIG. 3 exemplary illustrates the processing of linear data signals at a receive station to remove interfering circular polarized data signals.

DETAILED DESCRIPTION OF THE INVENTION

Figure 1:
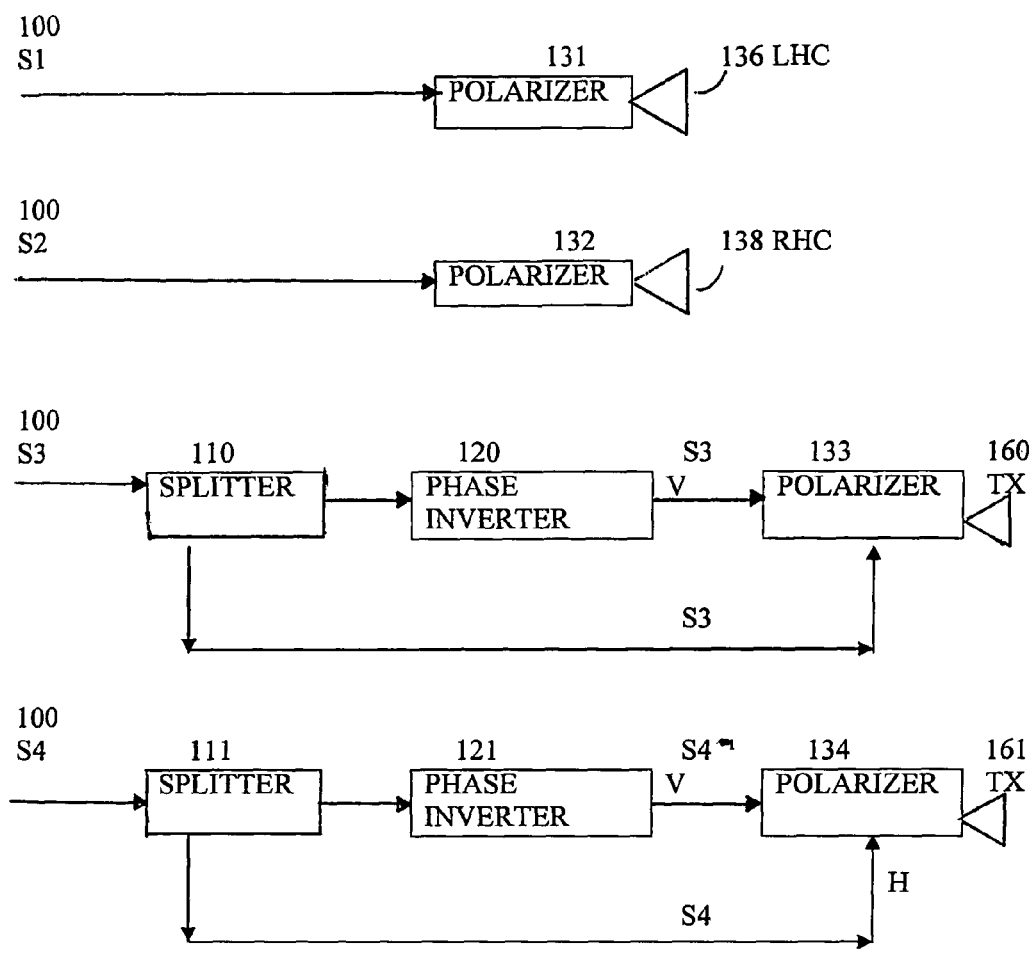
FIG. 1 exemplary illustrates a system for transmitting four channels of distinct data over a same frequency using multiple polarized data signals.

FIG. 1 illustrates a method of communicating distinct data over a same frequency using multiple polarized data signals. Information streams conveying first data, second data, third data, and fourth data are provided. They may contain analog or digital information. These are used to generate modulated signals on the selected transmit frequency. The modulated signals will be referenced to as data signals one, two, three and four 100. These encoded signals typically occupy a range of frequencies referred to as a frequency band. Each frequency band is a contiguous set of frequencies with a center frequency and multiple side frequencies. As used herein, the term "single frequency" refers to a frequency band having a center frequency and multiple side frequencies. Two signals of the "same frequency" means that at least one of the frequencies used to transmit a data signal is the same frequency as one of the frequencies of a second data signal, i.e., that at least part of the band of frequencies overlaps. The said data signals can occupy the same band or partially overlapping bands.

As used herein, the term "antenna" refers to any device capable of receiving or transmitting polarized electromagnetic signals.

Data signals three is split into two copies 110. One copy of data signal three (S3) is inverted 180 degrees (S3-1) 120. Data signal three (S3) is polarized 133 in linear, for example vertical, and the inverse of S3 is polarized in the orthogonal polarity: horizontal.

Data signals four is split into two copies 111. One copy of data signal four (S4) is inverted 180 degrees (S4-1) 121. Data signal four (S4) is polarized in linear 134, for example vertical, and the inverse of S4 is polarized in the orthogonal polarity: horizontal.

Data signals one (S1) and two (S2) are polarized in circular polarization 131 and 132, in this example, left (LHC) and right (RHC). The circular polarized data signals data signals (S1 and S2) are transmitted 136 and 138 from one or more transmitting stations to one or more receiving stations. The polarized linear third data signal S3 and its inverse S3-1 are transmitted from a same antenna 160 which may be a different or the same antenna as used to transmit S1 and S2. When the third data signals are transmitted they are transmitted so that S3 and S3-1 maintain their 180 degree out of phase relationship and they are transmitted at the same amplitude so that when combined at reception the two waves sum to zero. S3 is transmitted, for example, in the vertical port and S3-1 is transmitted in the orthogonal port, in this example, horizontal.

The polarized linear fourth data signal S4 and its inverse S4-1 are transmitted from a same antenna 161 which may be a different or identical antenna to that used to transmit S1, S2 and S3. When the fourth data signals are transmitted they are transmitted so that S4 and S4-1 maintain their 180 degree out of phase relationship and they are transmitted at equal amplitude so that when combined at reception in a circular polarized antenna they two waves sum to zero. S4 is transmitted, for example, in the vertical alignment and S4-1 is transmitted in the orthogonal alignment, horizontal. However, the vertical alignment of S4 is rotated 45 degrees from the vertical alignment of S3. The horizontal alignment of S4 is rotated 45 degrees from the horizontal alignment of S3.

When looking at the radiation pattern of S3 and its inverse around the transmit axis, you will notice that the nulls in S3's power, that is where the measured transmit power is zero, occur at 45 degrees, 135 degrees, 225 degrees and 315 degrees. By rotating the transmission of S4 and its inverse 45 degrees from S3 and its inverse the maximum radiation patterns of S4 and S4-1 line up with these nulls in the third data signals. Likewise, the nulls for S4 and its inverse are at 45, 135, 225 and 315 degrees from the the vertical transmit axis of S4. The nulls of S4 with S4-1 line up with the maximums of S3 with S3-1. Consequently, a receive antenna aligned with S3 and S3-1 does not receive S4 or S4-1 interference. A receive antenna aligned with S4 and S4-1 does not receive S3 or S3-1 interference.

FIG. 1R illustrates a method of receiving the four signals transmitted by the method of FIG. 1. At each of the receiving stations, the first data, the second data, the third data, and fourth data are obtained from the received data signals by detecting and decoding the received data signals. Each of the receiving stations consists of a receive antenna, for example, a linear polarized antenna, or a circular polarized antenna, or an antenna of both polarities, and electronics for detecting the received data signals. Antennas of a linear polarity are responsible for receiving and detecting the linearly polarized data signals and the antennas of a circular polarity are responsible for receiving and detecting the circularly polarized data signals.

Said transmitted circular data signals S1 and S2 are received at one or more circular polarized receiving stations 170A and 170B. Said pair of linear polarized data signals S3 and S3-1 comprise two polarized data signals that are inverse to each other, i.e., 180 degrees opposite to each other. When circular antennas are pointed toward to a linear transmitting antenna, each of the two ports of the circular feed or antenna picks up both the horizontal and vertical linearly polarized data signals at 50% power. Each polarity, left and right, of a circular antenna receives either S1 or S2, along with both linear polarized data signals S3 and S3-1 in equal levels plus S4 and S4-1 in equal levels. The linear and inverse polarized data signals are designed to cancel each other out when received together at similar amplitudes; therefore, in any antenna of circular polarity, the linearly polarized data signals cancel each other out before reaching the receive electronics. Consequently, no processing of the linear polarized data signals is required in the circular polarity antenna receive electronics 140 and 141, and the receive systems behave as they would in the absence of the linearly polarized data signals. The linear transmissions are transparent to the circular polarity receiving station electronics. Signals. S4 and S4-1 are also inverse from each other and are of equal amplitude so they also cancel in circular antennas before reaching the electronics. The circularly polarized signals S1 and S2 are processed as if their were no linear polarized signals transmitted on the same path and frequency since the linear interfering signals have canceled out in the antenna.

To detect the third data signal, S3 and S3-1 are received by a same antenna of linear polarity 170C. To acquire the third data the linearly polarized data signals must be picked up in separate orthogonal linear polarities 180 aligned with the vertical and horizontal transmissions of the third data signal. When the linearly polarized data signals are received by the antenna of linear polarity, the circularly polarized first data signal and the circularly polarized second data signal are also picked up. After any necessary phase adjustments to keep the third data signal and its inverse 180 degrees out of phase 194, one of the data signals received in one polarity of the antenna of linear polarity is inverted 190 and summed with the other polarity data signal 196. When the data signals are inverted and summed together, the linearly polarized data signals match each other, thereby increasing the signal strength of the linearly polarized data signals. Since each of the two linearly polarized data signals contains copies of the first data signal and the second data signal, and one of the two linear signals has been inverted, when the horizontal data signal and the vertical data signal are summed, the two interfering circularly polarized data signals containing the first and the second data cancel each other out, resulting in minimal interference to the linearly polarized third data signals.

For example, in the antenna of linear polarity 170C, in the horizontal polarity the third data signal and the left and right circularly polarized data signals are received. In the vertical polarity of said antenna, the inverse of the third data signal and the circularly polarized data signals are received. One of the received data signals, for example, the data signal comprising the inverse of the third data signal and the circularly polarized data signals received in the vertical polarity of the same antenna is inverted 190 and summed 196 with the other received data signal; that is the signal comprising the third data signal and the left and right circularly polarized data signals received at the horizontal polarity of the same antenna. Upon summation, the left hand circularly polarized data signals and the inverse of the left hand circularly polarized data signals cancel each other out, and the right hand circularly polarized data signals and the inverse of the right hand circularly polarized data signals cancel each other out. The third data signal and the inverse of the inverse of the third data signal match each other to increase signal strength of the third data signal. This enhanced signal is forwarded to the receive electronics 198 to detect the third data S3.

The third data signals are transmitted at a forty five degree offset from the fourth data signals when looking at the axis of transmission. When looking at the third data signal, assigning the vertical polarity as being at zero degrees, the nulls where the signals have zero power occur at 45, 135, 225 and 315 degrees around the transmit axis. The fourth data signals S4 and S4-1 are transmitted in these nulls. Likewise, the fourth data signals have nulls 45 degrees off the vertical and horizontal axis and the third data signals are transmitted in these nulls. The third and fourth data signals threrefore do not interfere with each other when the receive antenna linear receive ports are correctly aligned to the selected linear transmit ports.

S4 and S4-1 are received by a same antenna of linear polarity 170D. The antenna feed is aligned to the polarity of the S4 and S4-1 transmissions.

To acquire the fourth data the linearly polarized data signals S4 and S4-1 must be picked up in separate linear polarities aligned with the vertical and horizontal linear transmissions of the fourth data signal 181. The linearly polarized fourth data signal and the inverse of the linearly polarized fourth data signal are picked up in orthogonal poles of the same antenna. When the linearly polarized data signals are received by the antenna of linear polarity, the circularly polarized first data signal and the circularly polarized second data signal are also picked up. One of the data signals received in one polarity of the antenna of linear polarity is inverted 191. After any phase adjustments 195 required to keep the fourth data signal and its inverted inverse in phase the two signals are summed. When the data signals are summed together 197, the linearly polarized data signals match each other, thereby increasing the signal strength of the linearly polarized data signals. Since each of the two linearly polarized data signals S4 and S4-1 contains a copy of the first data signal and the second data signal, and one of S4 and S4-1 has been inverted, when the horizontal data signal and the vertical data signal are summed, the two interfering circularly polarized data signals containing the first and the second data cancel each other out, causing minimal interference to the linearly polarized fourth data signals.

The antennas transmitting the first, second, third and fourth data signals can all be located in separate places or the same place. When transmitting S3 then S3-1 must also be transmitted from the same location to maintain their phase relationship. For S3 and S3-1 if one is transmitted the other needs to be transmitted. When transmitting S4 then S4-1 must also be transmitted from the same location to maintain their phase relationship. For S4 and S4-1 if one is transmitted the other needs to be transmitted. A receive antenna aligned with S3 and S3-1 does not receive S4 or S4-1 interference. A receive antenna aligned with S4 and S4-1 does not receive S3 or S3-1 interference. Transmitting any of S1, or S2 or S3 or S4 is unnecessary for the method to work.

In other configurations, S2 can be an identical in phase copy of S1 or it can be a phase inverted copy of S1. S1 and S2 do not need to be transmitted or even present at any time. In the absence of S1 and S2 and where the receive antenna may be in motion and not aligned to the transmit antenna, a three dimensional array of antennas can be used to search for either S3 or S4 by selecting for the desired signal by choosing from the signals picked up by the elements of the array.

Often when a signal is being transmitted in a frequency band parts of the signal will extend over into adjacent bands causing interference. When harmonic signals are being transmitted on adjacent or nearby bands, the above methods can be used to minimize interference between signals. For example, by transmitting a circular signal in one band and its inverse in the orthogonal polarity, linear signals in an adjacent band will not be affected by the circular signals since the circular signals cancel in the linear receive antennas.

FIG. 2 illustrates the the power levels around the axis of transmission for the linear data signals S3 and S4 and their inverted signals S3-1 and S4-1. The formula for relative power for two transmitted inverse linear signals, orthogonal to each other as measured around the axis is described by (cos θ×cos θ)−(cos (θ+90)×cos (θ+90)), where θ is the measurement point in degrees around the transmit axis from vertical. The zero power points are at 45, 135, 225 and 315 degrees. As shown in FIG. 2, the second set of linear signals, containing the fourth data signals S4 and S4 inverted (S4-1) are aligned to the nulls of the third data signals (S3 and S3-1) so that there is no interference between the third data signals and the fourth data signals at linear receive antennas 170C or 170D.

FIG. 3 exemplary illustrates reception of said transmitted data signals at a receiving station 302A. To receive the third data signal (S3), an antenna of linear polarity that can receive separately both horizontal and vertical linearly polarized orthogonal data signals is required. The antenna polarities are aligned with those of the transmit antenna transmitting data signal S3. The third data signal and the inverse of the third data signal are linearly polarized, for example, the third data signal is a vertically polarized (V) data signal (S3), the inverse of the third data signal is a horizontally (H) polarized data signal (S3-1). The first data signal is a left hand circularly (LHC) polarized data signal (S1), and the second data signal is a right hand circularly (RHC) polarized data signal (S2). S1 and S2 are transmitted along a same or proximate path to that of S3.

The horizontal polarity of the antenna 302A picks up S3 plus the RHC polarized second data signal S2 plus the LHC polarized first data signal S1. The vertical polarity of antenna 302A picks up the inverted S3 plus the RHC S2 plus the LHC S1. The data signal received at one polarity of the antenna 302A, for example, the vertical polarity is inverted. The result is inverted S1 plus inverted S2 plus inverse of inverted S3. The inverse of the inverted S3 with the included inverses of S1 and S2 is summed with the not inverted S3 which includes S1, and S2 310. The data signals S1 and S2 and the inverted data signals S1 and S2 exactly cancel each other out. S3 matches the inverse of the inverted S3, resulting in a stronger signal S3 with minimal interference from the two data signals S1 and S2.

The same method is followed to receive and detect the fourth data signals. The antenna pick up elements must be aligned to pick up S4 and S4-1 in the two linear ports. S3 does not interfere because there is no S3 power being transmitted at the same rotation angles as the S4 signals, since the S4 signals are transmitted in the nulls of S3. The same procedure of inverting the signals received in one polarity and summing with the signals received in the orthogonal polarity is used for the fourth signals S4 and S4-1.

In order to receive the circularly polarized data signals, an antenna is required that receives either the right or left hand circularly polarized data signals or both. The two linearly polarized third data signals cancel each other out (sum to zero) when received at the antenna receive element or feed of circular polarity. The two linearly polarized fourth data signals cancel each other out when received at the antenna receive element or feed of circular polarity. Hence, only the circularly polarized data signals propagate past the antenna pick up element or feed of circular polarity to the electronics. Further detection of the circularly polarized data signals occurs as it would without interference from linear signals S3 and S4.

Even though the circularly polarized data signals and the linearly polarized data signals do not need to be transmitted by the same antenna, the third data signal and the inverse of the third data signal must be transmitted synchronously from the same location. This allows them to maintain their phase relationship as they propagate through space. Also, the fourth data signal and the inverse of the fourth data signal must be transmitted 180 degrees out of phase from the same location.

Consider an example where an existing geostationary satellite communicating from an orbital position using circularly polarized data signals is supplemented by a new satellite possibly owned and operated by a different company. The new satellite has to transmit a linearly polarized data signal S3 and an inverse S3-1 in orthogonal linear polarities. The same satellite can transmit two more linear signals S4 and S4 inverse at a forty five degree rotation around the transmit axis from S3 and S3-1. The linearly polarized data signals do not interfere with the received circular signals at any of the existing circular receiving stations. Since the linear data signals cancel each other in the feeds of circular polarity of the receiving stations the S3 and S4 signals do not interfere with the circular polarity signals S1 and S2. The new satellite is able to provide a doubling of capacity for the orbital position. The linearly polarized data signals and the circularly polarized data signals need not be transmitted by the same satellite or even from the same orbital slot.

In another configuration, the two circular signals S1 and S2 are the same but transmitted 180 degrees out of phase with each other, ie, inverse. S3 and S3-1 are sent in two linear orthogonal polarities and S4 and S4-1 are sent in two orthogonal linear polarities at a 45 degree rotation from S3 and S3-1. In this configuration only three distinct signals are transmitted. With every signal its inverse is also transmitted. S1 and S1 inverse need to be transmitted from the same location. If S1 is present its inverse must also be transmitted. Also when S3 is transmitted its inverse must also be transmitted. When S4 is transmitted its inverse needs to also be transmitted. The data signals S1, S3 and S4 should be of the same amplitude as their inverses, and transmitted at exactly 180 degrees out of phase so that when received together the two inverted signals cancel.

The advantage of this configuration is that only singular polarity antennas are required to receive and detect the data signals. In the case of the inverse circular data signals, either polarity can be picked up and the other ignored. The linear signals S3 and S3-1 cancel in the circular feed or antenna pick up element. The linear signals S4 and S4-1 also cancel in the circular pick up element before reaching the electronics. So S1 can be processed as it would in the absence of interfering signals since any interfering signals cancel.

Similarly, for the linear signals S3 and S3-1 either one can be picked up. S3 and S3-1 are transmitted in the nulls of S4 and S4-1. The circular signals sum to zero in the feed or pick up element of the linear polarity antenna before reaching the electronics. So there is minimal interference to S3 from S4 and S1. The signal is processed as it would in any normal system without interfering signals.

For the linear signals S4 and S4-1 either one can be picked up. S4 and S4-1 are transmitted in the nulls of S3 and S3-1. The circular signals sum to zero in the feed or pick up element of the linear polarity antenna before reaching the electronics. So there is minimal interference to S4 from S3 and S1. The signal is processed as it would in any system without interfering signals.

The advantage of this configuration is that receive antennas of only one polarity can be used and no modifications are needed to existing receive electronics.

Figure 4:
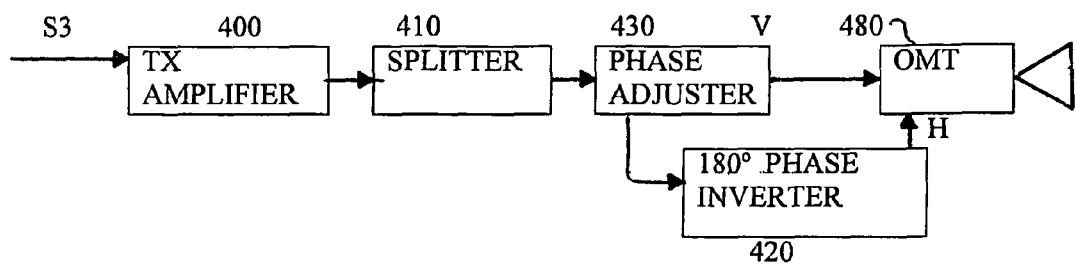
FIG. 4. Illustrates an exemplary diagram for receive electronics.

FIG. 4 exemplary shows an easy implementation of the linear transmit electronics. The amplified data signal 400 to be transmitted, for example, is split into two signals by a splitter 410. One of the copies goes into a phase inverter 420 and comes out at a 180 degree phase relationship to the other. A phase compensator 430 adjusts for phase delays in the transmission lines and electronics and antenna, and insures that the two signals are transmitted at a 180 degree phase rotation from each other. Each of the two inverse signals are fed into the two orthogonal linear transmit ports vertical and horizontal of antenna 480. The output amplitudes are equal and the phase compensator insures a transmitted 180 degree phase relationship.

Although the invention has been described herein with reference to particular means, materials and embodiments, the invention is not intended to be limited to the particulars disclosed herein; rather, the invention extends to all functionally equivalent structures, methods and uses, such as are within the scope of the appended claims. As an example, much of the description references radio frequency communications. This invention also applies to light frequency communications and higher frequency communications where emitters and filters might be used. This invention applies to all electromagnetic transmissions that can be polarized, and is not intended to be limited to any frequency range. Those skilled in the art, having the benefit of the teachings of this specification, may effect numerous modifications thereto and changes may be made without departing from the scope and spirit of the invention in its aspects.

I claim:

1. A method of communicating distinct data over a same frequency using polarized data signals, comprising the steps of:
   providing a plurality of data signals conveying information, wherein said data signals comprise a first data signal conveying first data, a second data signal conveying second data, and a third data signal conveying third data, and a fourth data signal conveying fourth data, wherein said data signals are of said same frequency;
   polarizing said first data signal in one of two circular polarities and transmitting said polarized signal;
   polarizing said second data signal in other circular polarity and transmitting said polarized signal;
   transmitting said third data signal and inverse of said third data signal in each of two orthogonal linear polarizations from a transmitting station, to one or more receiving stations; and
   transmitting said fourth data signal and inverse of said fourth data signal in each of two orthogonal linear polarizations at a forty five degree rotation around the transmit axis from said third data signal and inverse of third data signal, from a transmitting station to one or more receiving stations; and
   receiving said transmitted data signals at one or more receiving stations, wherein said first data, said second data, said third, and said fourth data are obtained from said received data signals;
   whereby amount of distinct data transmitted to said receiving stations over said same frequency is increased.

2. The method of claim 1, wherein said first data signal conveys said first data, said second data signal conveys said second data, and said third data signal and said inverse of said third data signal convey said third data, and said fourth data signal and said inverse of said fourth data signal convey said fourth data.

3. The method of claim 1, wherein at said receiving stations one of said third data signal and said inverse of said third data signal is inverted and summed with other one of said inverse of said third data signal and said third data signal at an antenna of linear polarity for obtaining said third data at increased strength, and wherein said first data signal and said second data signal cancel each other out at said summation.

4. The method of claim 1, wherein after reception one of said fourth data signal and said inverse of said fourth data signal is inverted and summed with other one of said inverse of said fourth data signal and said fourth data signal at an antenna of linear polarity at said receiving stations for obtaining said fourth data at increased strength, and wherein said first data signal and said second data signal cancel each other out at said summation.

5. The method of claim 1, wherein phase and level of said third data signal and said inverse of said third data signal are adjusted at transmission for enabling transmission of third data signal and its inverse at a 180 degree phase relationship and at equal amplitudes for enabling cancellation on reception at an antenna of circular polarization at said receiving stations; and wherein phase and level of said fourth data signal and said inverse of said fourth data signal are adjusted at transmission for enabling transmission of fourth data signal and its inverse at a 180 degree phase relationship and at equal amplitudes for enabling cancellation on reception at an antenna of circular polarization at said receiving stations.

6. The method of claim 1, wherein said first data signal and said second data signal are transmitted from one of a single transmitting station and a plurality of said transmitting stations and are received at one of a single receiving station and a plurality of said receiving stations.

7. The method of claim 1, wherein said third data signal and said inverse of said third data signal are transmitted from one of said linear transmitting stations and received together at an antenna of circular polarity at one of said receiving stations for enabling said third data signal and said inverse of said third data signal to cancel each other out at reception at said same antenna.

8. The method of claim 1, wherein said fourth data signal and said inverse of said fourth data signal are transmitted from one of said transmitting stations and received together at a same antenna of circular polarity at one of said receiving stations enabling said fourth data signal and said inverse of said fourth data signal to cancel each other out when received together at said same antenna.

9. The method of claim 1, wherein said first data signal and said second data signal are identical and transmitted in phase.

10. The method of claim 1 wherein the first data signal and second data signal are the same but transmitted 180 degrees out of phase from each other.

11. A method of communicating distinct data over a same frequency using polarized data signals, comprising the steps of:
- providing a plurality of data signals conveying information, wherein said data signals comprise a first data signal conveying first data, a second data signal conveying second data, a third data signal conveying third data, and a fourth data signal conveying fourth data, wherein said data signals are of said same frequency,
- polarizing said first data signal in one of two circular polarities and transmitting said polarized signal;
- polarizing said second data signal in other circular polarity and transmitting said polarized signal;
- transmitting said third data signal and inverse of said third data signal in each of two orthogonal linear polarizations from a transmitting station, to one or more receiving stations; and
- transmitting said fourth data signal and inverse of said fourth data signal in each of two orthogonal linear polarizations at a forty five degree rotation around the transmit axis from said third data signal and inverse of third data signal, from a transmitting station to one or more receiving stations.

12. The method of claim 11, further including the receiving of said transmitted third data signal and its inverse in orthogonal linear polarities at one or more receiving stations, and at said receiving stations one of said third data signal and said inverse of said third data signal is inverted and summed with other one of said inverse of said third data signal and said third data signal for obtaining said third data at increased strength, and wherein interfering said first data signal and said second data signal cancel each other at said summation; further including the receiving of said transmitted fourth data signal and its inverse in orthogonal linear polarities at one or more receiving stations, and at said receiving stations one of said fourth data signal and said inverse of said fourth data signal is inverted and summed with other one of said inverse of said fourth data signal and said fourth data signal for obtaining said fourth data at increased strength, and wherein said first data signal and said second data signal cancel each other at said summation.

13. The method of claim 11, wherein phase and level of said third data signal and said inverse of said third data signal are adjusted at transmission for enabling transmission of third data signal and its inverse at a 180 degree phase relationship and at equal amplitudes for enabling cancellation on reception at an antenna of circular polarization at said receiving stations; and wherein phase and level of said fourth data signal and said inverse of said fourth data signal are adjusted at transmission for enabling transmission of fourth data signal and its inverse at a 180 degree phase relationship and at equal amplitudes for enabling cancellation on reception at an antenna of circular polarization at said receiving stations.

14. The method of claim 11 wherein said first and second circularly polarized signals carry the same first data and are transmitted inverse to each other from a same location and are transmitted at equal amplitudes so that when received together said two inverse signals cancel.

* * * * *